US009888102B2

(12) United States Patent
Bouthinon et al.

(10) Patent No.: US 9,888,102 B2
(45) Date of Patent: Feb. 6, 2018

(54) PORTABLE RADIO COMMUNICATION DEVICE WITH ADJUSTABLE GAIN AND ASSOCIATED GAIN ADJUSTMENT METHOD

(71) Applicants: CONTINENTAL AUTOMOTIVE FRANCE, Toulouse (FR); CONTINENTAL AUTOMOTIVE GmbH, Hannover (DE)

(72) Inventors: Jean-Christophe Bouthinon, Cugnaux (FR); Frederic Lathiere, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/968,537

(22) Filed: Dec. 14, 2015

(65) Prior Publication Data
US 2016/0182696 A1 Jun. 23, 2016

(30) Foreign Application Priority Data
Dec. 17, 2014 (FR) ..................................... 14 62585

(51) Int. Cl.
*H04M 1/02* (2006.01)
*G07C 9/00* (2006.01)
(Continued)

(52) U.S. Cl.
CPC ....... *H04M 1/0277* (2013.01); *G07C 9/00111* (2013.01); *G07C 9/00309* (2013.01);
(Continued)

(58) Field of Classification Search
CPC ........ H01Q 1/243; H01Q 9/42; H01Q 13/103; H01Q 1/38; H01Q 1/521; H01Q 5/371;
(Continued)

(56) References Cited

U.S. PATENT DOCUMENTS 5,974,041 A * 10/1999 Kornfeld .............. H03F 1/0277
370/342
2010/0188300 A1 7/2010 Anguera et al.
(Continued)

OTHER PUBLICATIONS

French Search Report, dated Aug. 3, 2015, from corresponding French Application.

*Primary Examiner* — George Eng
*Assistant Examiner* — Jing Gao
(74) *Attorney, Agent, or Firm* — Young & Thompson

(57) ABSTRACT

A portable radio communication device D' with adjustable total gain and an associated gain adjustment method via a conductive metal frame C situated at the periphery of the portable device D'. For this purpose, the frame C includes several metal sections P1, P2, P3, P4 not connected to each other and separated from each other by openings F1, F2, F3, F4. Switching elements S1, S2, S3, S4 make it possible to electrically connect two consecutive sections in such a way as to modify the length of the sections and to modify the electromagnetic coupling between the antenna A and the metal frame C. The modification of coupling causes a modification of the value of the resultant gain Gr of the antenna A. A calibration step makes it possible to select the sections to be connected together in order to obtain the desired resultant gain Gr of the antenna A.

14 Claims, 4 Drawing Sheets

(51) Int. Cl.
    *H01Q 1/24*    (2006.01)
    *H01Q 3/44*    (2006.01)
    *H01Q 1/32*    (2006.01)
    *H01Q 9/42*    (2006.01)

(52) U.S. Cl.
    CPC ........... *H01Q 1/243* (2013.01); *H01Q 1/3241* (2013.01); *H01Q 3/44* (2013.01); *H01Q 9/42* (2013.01)

(58) Field of Classification Search
    CPC .......... H01Q 13/10; H01Q 1/007; H01Q 1/52; H01Q 1/3241; H01Q 3/44; H04W 88/06; H04W 84/18; H04W 4/008; H04W 52/028; H04W 88/02; H04B 5/0081; H04B 1/40; H04M 1/026; H04M 1/7253; H04M 1/0277; G07C 9/00111; G07C 9/00309
    See application file for complete search history.

(56) References Cited

U.S. PATENT DOCUMENTS

2013/0016632 A1\*  1/2013  Mujtaba ............... H04B 7/0608
                                                             370/275
2013/0027287 A1   1/2013  Lee et al.
2014/0320375 A1  10/2014  Kessler et al.

\* cited by examiner

Fig 7

| Gr | S1 | S2 | S3 | S4 |
|---|---|---|---|---|
| $Gr_{min}$ | 1 | 1 | 1 | 1 |
| G | 0 | 0 | 0 | 0 |
| Gr | 1 | 0 | 0 | 0 |
| $Gr_{int}$ | | | | |
| $Gr_n$ | 0 | 0 | 0 | 1 |
| $Gr_{max}$ | 1 | 1 | 1 | 0 |

PORTABLE RADIO COMMUNICATION DEVICE WITH ADJUSTABLE GAIN AND ASSOCIATED GAIN ADJUSTMENT METHOD

FIELD OF THE INVENTION

The invention relates to a portable radio communication device with adjustable gain and to an associated gain adjustment method for a motor vehicle. The invention applies more particularly to systems for "hands free" access to motor vehicles. A so-called "hands free" system for access to a motor vehicle allows an authorized user to lock and/or unlock the openings of his vehicle without using a key. For this purpose, the vehicle carries out the identification of a badge or of a remote control or of a mobile telephone carried by the user and if the badge or the remote control or the mobile telephone is identified as belonging to the vehicle, then the vehicle locks or unlocks its openings.

BACKGROUND OF THE INVENTION

This "hands free" access system is known to those skilled in the art. It generally consists of an electronic control unit installed in the vehicle, one or more radio-frequency (RF) antennas situated on the vehicle and an identification badge or remote control comprising an RF antenna and an associated electronic circuit carried by the user.

An identifying exchange between the badge and the vehicle by the intermediary of the RF antennas allows the identification of the badge by the vehicle and the triggering of the locking or unlocking of the openings by the latter.

In order to carry out the radio communication with the vehicle, the portable radio communication device D comprises, in a insulating casing B (see FIG. 1), a printed circuit 30 upon which there is a radio-frequency antenna A electrically connected to an associated electronic transmitter/receiver circuit 50 itself comprising:
- a receiver unit Rx making it possible to receive the data coming from the vehicle, transmitted by radio-frequency waves,
- a transmitter unit Tx making it possible to send data to the vehicle by radio-frequency waves,
- a gain amplifier Gx, associated with the gain G of the antenna A,
- a microcontroller 10 managing the transmission/reception of the data,
- an impedance adapting unit 20, generally a network of capacitive and inductive elements in order to adapt the impedance of the antenna A,
- a switch S making it possible to select the receiver unit Rx or the transmitter unit Tx depending on the phase in which the communication of the antenna A is: receiving data or transmitting data.

The switch S and the gain amplifier Gx are controlled by the microcontroller 10.

The portable device D is powered by a battery (not shown) mounted on the printed circuit 30.

This portable radio communication device D is known to those skilled in the art and will not be described in more detail here.

The gain G of the antenna A of the portable device D is determined by the effective area of the antenna A and therefore of the space allocated to it in the insulating casing B. As the geometry of the antenna A is fixed, said gain G is also fixed.

As for the gain amplifier Gx, this makes it possible to adapt by software means the gain $G_{tot}$ of the portable device D during the transmission of data by said antenna A, according to the type of application of the portable device D, where $G_{tot}$=Gx+G.

The total gain is defined by:

$$G_{tot}=Gx+G.$$

where:
Gx: Gain of the gain amplifier,
G: Gain of the antenna A.

Most often, the gain $G_{tot}$ of the portable device D is determined according to the legislation in force concerning the authorized maximum power of radio-frequency transmissions for the country in which the vehicle is marketed.

There are however notable differences from country to country between the maximum power values authorized for the transmission of radio-frequency waves.

In order to reduce the complexity in the production of the portable device D, the gain $G_{tot}$ is generally adjusted according to the most severe legislation.

Thus the effective area, that is to say the gain G of the antenna A and a maximum gain $Gx_{max}$ of the gain amplifier Gx are previously fixed for the maximum radiated power authorized by the most severe legislation.

The total gain $G_{tot}$ can then be adjusted using the gain amplifier Gx, within the limit of its maximum gain value $Gx_{max}$. The maximum value of the gain $Gx_{max}$ is determined as a function of the maximum acceptable electrical consumption of the portable device D.

For certain countries in which the legislation concerning the maximum authorized radiated power of radio-frequency transmissions is less severe, the total gain $G_{total}$ of the portable device D is not therefore adapted; in fact it could be greater than that which is previously adjusted in said portable device D.

As previously explained:
- the gain G of the antenna A is fixed and is limited, because the space allocated in the portable device D for said antenna A is restricted
- the electrical consumption of the portable device D itself limits the value of the maximum gain $Gx_{max}$ of the gain amplifier Gx.

By increasing the transmission power of the radio-frequency waves (that is to say by increasing the total gain $G_{tot}$), the detection of said waves by the vehicle and therefore the reliability of the "hands-free" access system is improved.

It will be understood that there is a need to have a gain G of the antenna A greater that that currently available in order to increase the total gain $G_{tot}$ of the portable device.

SUMMARY OF THE INVENTION

The invention proposes a portable radio communication device with adjustable total gain, the device comprising:
- a radio-frequency antenna,
- an electronic transmitter/receiver circuit electrically connected to said antenna, said antenna and the electronic transmitter/receiver circuit being mounted on a printed circuit, contained in an insulating casing, said device being noteworthy in that:
- said insulating casing comprises at its periphery at least partially a frame comprising at least two sections made of conductive metal, not connected and separated by an opening, and in that said device comprises moreover:
switching means, having a closed state in which the two sections are electrically connected to each other, and an open state in which the two sections are disconnected from each other,
means of controlling the switching means.

Thus by connecting the two sections with each other, the latter are electromagnetically coupled to the antenna, and they increase the effective area of said antenna and consequently the total gain of the portable device.

In a preferred embodiment, the frame comprises:
a plurality of sections made of conductive metal, said sections not being connected and separated from each other by openings, and the device comprises moreover:
a plurality of switching means, each switching means having a closed state in which two consecutive sections are electrically connected to each other, and an open state in which two consecutive sections are disconnected from each other,
means of control of the plurality of switching means.

Advantageously, the sections all have different dimensions.

Moreover, the openings all have widths different from each other or identical to each other.

The device can be included either in a hands-free badge for access to a motor vehicle or in a mobile telephone.

The invention also relates to a method of adjusting the total gain of a portable radio communication device, said device comprising:
a radio-frequency antenna,
an electronic transmitter/receiver circuit electrically connected to said antenna, said antenna and the electronic transmitter/receiver circuit being included in a printed circuit contained in an insulating casing,
said adjustment method being noteworthy in that it comprises a prior step in which:
said insulating casing is equipped with a frame which surrounds the insulating casing at least partially and which comprises a plurality of sections made of conductive metal, said sections not being connected and separated from each other by openings,
the device is equipped with:
a plurality of switching means, each switching means having a closed state in which two consecutive sections are electrically connected to each other, and an open state in which two consecutive sections are disconnected from each other,
means of control of the plurality of switching means,
and in that said method comprises the following steps:
Step 1: the value of the total gain is measured for each open/closed state of each switching means,
Step 2: the value of the total gain is stored in the control means as a function of the open/closed state of each switching means,
Step 3: during the transmission/reception by the antenna, opening or closing of each switching means by the control means, according to the values stored in the preceding step in order to adjust the total gain to a desired value.

The invention also applies to any motor vehicle comprising a portable radio communication device according to any one of the features listed above.

BRIEF DESCRIPTION OF THE DRAWINGS

Other features and advantages of the invention will become apparent on reading the following description and on examination of the appended drawings in which:

FIG. 7 shows a calibration table of the method for adjusting the gain of a portable radio communication device according to the invention.

DETAILED DESCRIPTION OF THE INVENTION

Figure 1:
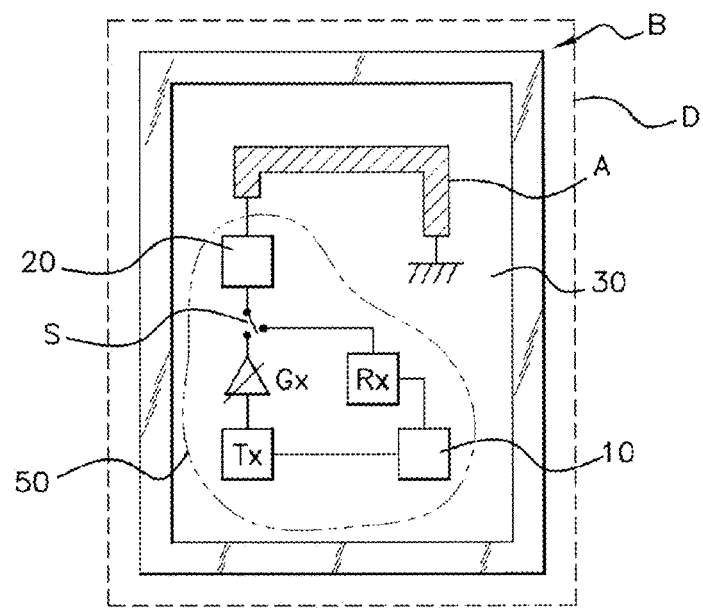
FIG. 1 shows a diagrammatic view of a portable radio communication device D of the prior art, described above.
Figure 2:
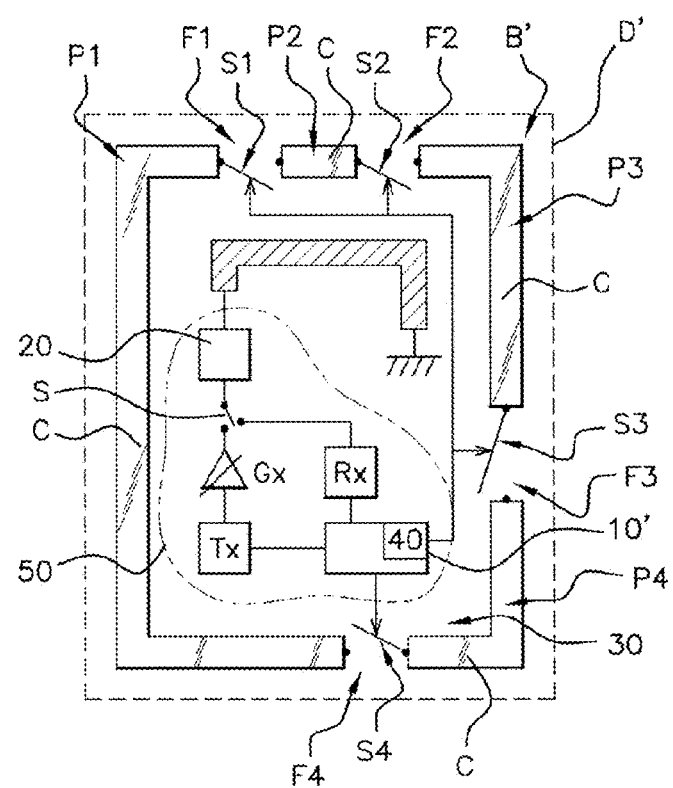
FIG. 2 shows a diagrammatic view of a portable radio communication device D' according to the invention.

FIG. 2 shows the portable radio communication device D' according to the invention.

The portable device D' comprises, in an insulating casing B', as in the prior art, a printed circuit 30' upon which are mounted:
a radio-frequency antenna A,
an associated electronic transmitter/receiver circuit 50 electrically connected to said antenna A and comprising:
a receiver unit Rx making it possible to receive the data coming from the vehicle, transmitted by radio-frequency waves,
a transmitter unit Tx making it possible to send data to the vehicle by radio-frequency waves,
a gain amplifier Gx, making it possible to adjust the total gain $G_{tot}$ of the portable device D', during the transmission of data by said antenna A,
a microcontroller 10 managing the transmission/reception of data,
an impedance adapting unit 20, generally a network of capacitive elements in order to adapt the impedance of the antenna A,
a switch S making it possible to select the receiver unit Rx or the transmitter unit Tx according to the phase in which the communication of the antenna A is: receiving data or transmitting data.

The portable radio communication device D' according to the invention comprises moreover a frame C, surrounding the insulating casing B' at its periphery.

The frame C comprises at least two sections made of conductive metal, for example of chrome, or of metallized plastic, that is to say plastic covered with a thin layer of metal, not connected to each other. The frame C can comprise a plurality of sections P1, P2, P3, P4 (see FIG. 2) made of conductive metal. The sections preferably have the shape of a strip of conductive metal, having a constant or variable thickness e (see FIG. 4), fixed to the casing B'.

The frame C can be situated in the same plane as that of the antenna A, on the sides of the insulating casing B'.

As the casing B' comprises a bottom and a cover and sides connecting the bottom to the cover, the frame C can also be situated on the periphery of the cover or on the periphery of the bottom of the casing B'.

In all of the embodiments of the frame C, said frame C surrounds the antenna A. The antenna A is therefore positioned inside the frame C.

In the example shown in FIG. 2, the frame C comprises four sections made of conductive metal, a first section P1, a second section P2, a third section P3 and a fourth section P4. The four sections, the first section P1, the second section P2, the third section P3 and the fourth section P4, have different shapes and dimensions. They can be rectilinear (second section P2), or have a right angle (first, third and fourth sections P1, P3, P4). For aesthetic purposes, the sections have the same width, 1 (see FIGS. 4 and 5).

The four sections are not connected to each other and they are separated by openings:
the first section P1 and the second section P2 are separated by a first opening F1,
the second section P2 and the third section P3 are separated by a second opening F2,
the third section P3 and the fourth section P4 are separated by a third opening F3,
the fourth section P4 and the first section P1 are separated by a fourth opening F4.

The openings F1, F2, F3, F4 are spaces between two consecutive sections, "consecutive" being understood to mean two adjacent sections, or being situated side by side. "Opening" is understood to mean a space between two consecutive sections, empty over the thickness e of the sections, or partially filled with a non-conductive material, for example plastic but in which there is no conductive metal.

The first, second, third and fourth openings F1, F2, F3, F4 can have an identical or different width. For example, in FIG. 4, the width la of the first opening F, is equal to the width of the second opening and to the width of the fourth opening F2, F4, but is smaller than the width lb of the fourth opening F3.

The portable device D' of the invention also comprises switching means S1, S2, S3, S4 (see FIG. 2), for example switches making it possible to electrically connect two adjacent sections to each other.

FIG. 2 shows four switching means:
a first switching means S1 having a closed state in which the first section P1 and the second section P2 are electrically connected to each other,
a second switching means S2 having a closed state in which the second section P2 and the third section P3 are electrically connected to each other,
a third switching means S3 having a closed state in which the third section P3 and the fourth section P4 are electrically connected to each other,
a fourth switching means S4 having a closed state in which the fourth section P4 and the first section P1 are electrically connected to each other.

The first, second, third and fourth switching means S1, S2, S3, S4 are preferably situated on the printed circuit 30, respectively at the level of the first, second, third and fourth openings F1, F2, F3, F4. The first, second, third and fourth switching means S1, S2, S3, S4 are controlled by control means 40, for example integrated in the microcontroller 10 which is mounted on a printed circuit 30'.

Figure 6:
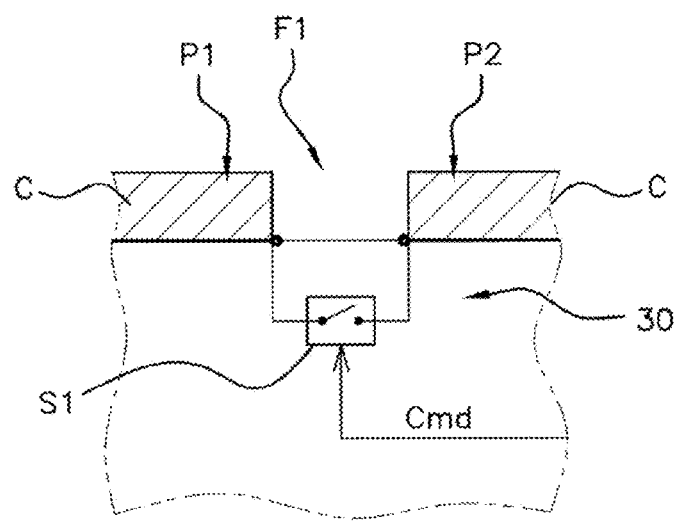
FIG. 6 shows a diagrammatic view of a first switching means of the portable radio communication device D' according to the invention.

The first switching means S1 is shown in FIG. 6. The first switching means S1 in this example is a switch, mounted on the printed circuit 30, at the level of the first opening F1. The first switching means S1 makes it possible to connect the first section P1 to the second section P2. The first switching means S1 is controlled by the microcontroller 10 and receives at its input an opening or closing control signal Cmd.

When the first switching means S1 is closed, the first section P1 and the second section P2 are electrically connected to each other. Any electric current flowing for example in the first section P1 propagates into the second section P2 and flows in the second section P2.

When the first switching means S1 is open, the first section P1 and the second section P2 are electrically disconnected. Any electric current flowing in the first section P1 cannot propagate into the second section P2.

The functioning of the second, or of the third, or of the fourth switching means S2, S3, S4 is identical to the functioning of the first switching means S1, as explained above for the respective sections to which they are connected.

The microcontroller 10 can open and/or close the first and/or the second and/or the third and/or the fourth switching means S1, S2, S3, S4 simultaneously or sequentially and thus connect all or some of the adjacent sections to each other.

Figure 3:
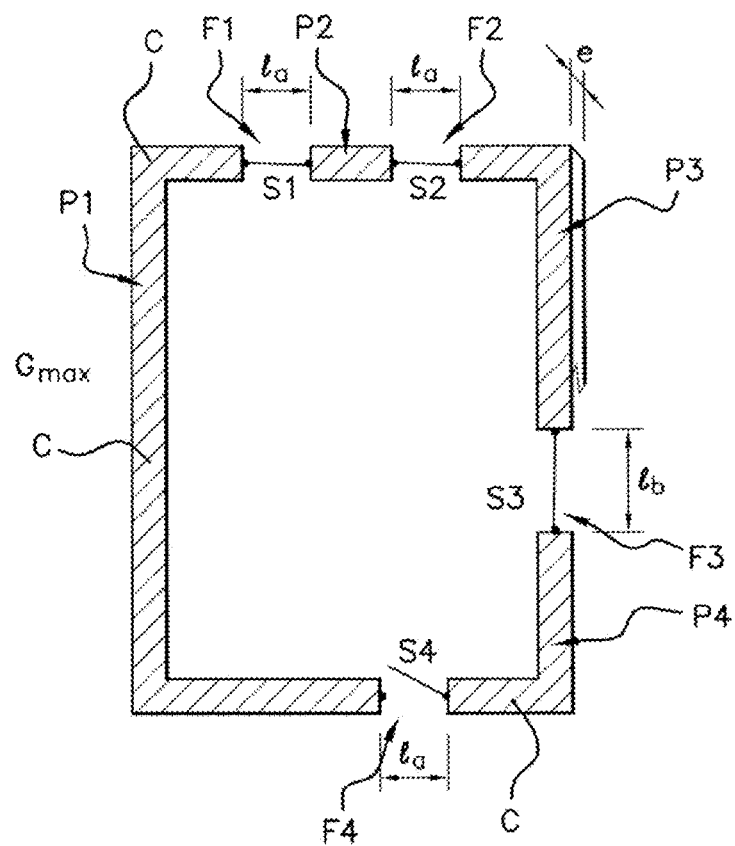
FIG. 3 shows a diagrammatic view of a first embodiment of a portable radio communication D' according to the invention.
Figure 4:
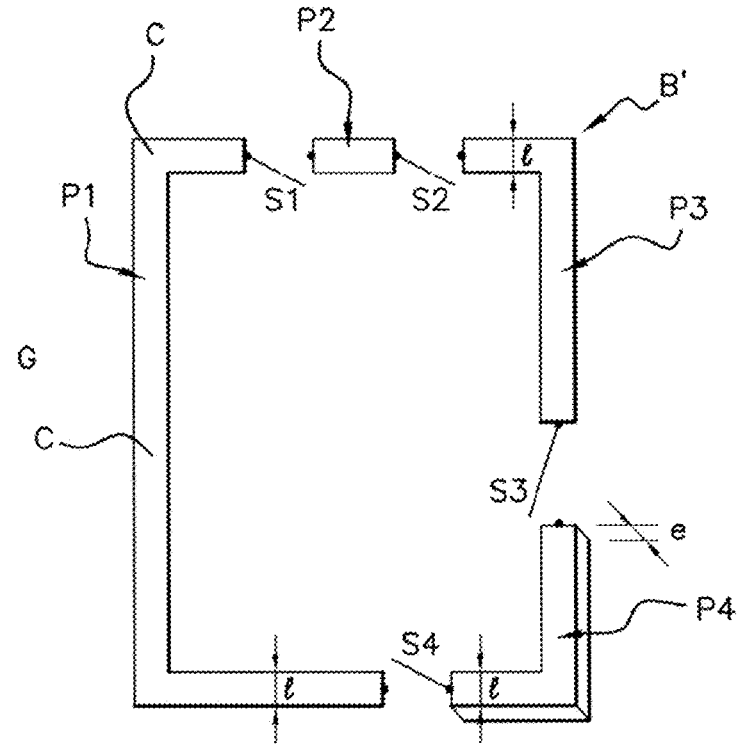
FIG. 4 shows a diagrammatic view of a second embodiment of a portable radio communication D' according to the invention.
Figure 5:
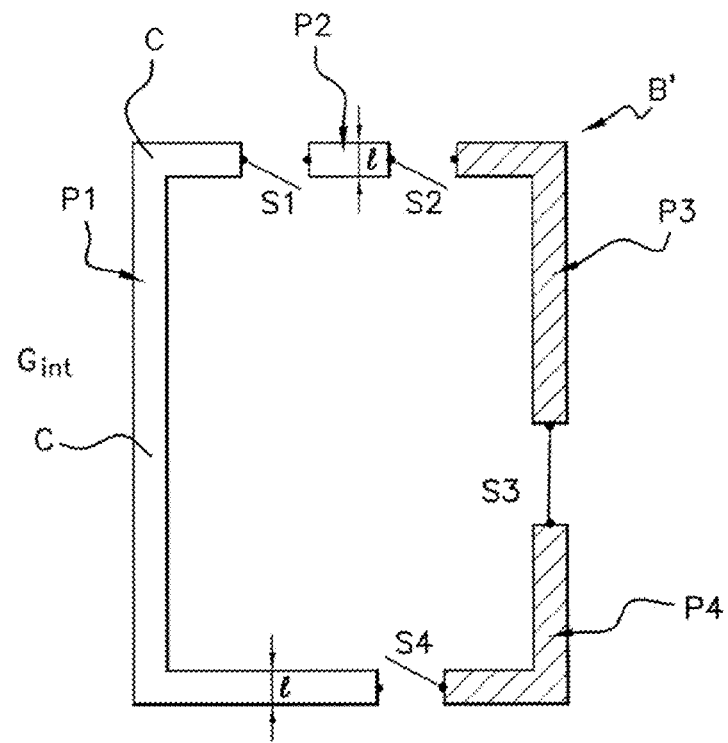
FIG. 5 shows a diagrammatic view of a third embodiment of a portable radio communication D' according to the invention.

This is shown in FIGS. 3, 4, and 5.

FIG. 3 shows a first embodiment of the invention, wherein the first, second and third switching means S1, S2, S3 are closed. The fourth switching means S4 is open. The first section S1 is therefore electrically connected to the second section P2, which itself is electrically connected to the third section P3, which itself is electrically connected to the fourth section P4. On the other hand, the first section P1 and the fourth section P4 are not electrically connected to each other.

FIG. 4 shows a second embodiment of the invention, wherein the first, second, third and fourth switching means S1, S2, S3, S4 are open. No section is connected to another section.

FIG. 5 shows a third embodiment, wherein the first, second and fourth switching means S1, S2, S4 are open. The third switching means S3 is closed. Consequently, the third section P3 is electrically connected to the fourth section P4. On the other hand, the first and second sections P1, P2 are not connected to each other, nor electrically connected to the third or to the fourth section P3, P4.

The functioning of the portable device D' of the invention is described below.

During the transmission or the reception of radio-frequency waves by the antenna A, electromagnetic coupling occurs between said antenna A and the conductive metal sections P1, P2, P3, P4 of the frame C which surround the antenna A. The electromagnetic field received or transmitted by the antenna A creates an induced electric current in each section P1, P2, P3, P4, each of which then functions as an antenna, (which will be called secondary antennas) and which in their turn transmit or receive a magnetic field. The coupling between the antenna A and the secondary antennas (that is to say the sections P1, P2, P3, P4) modifies the total gain $G_{tot}$ of the portable device D', resulting in a new total gain, called the resultant gain Gr.

$$Gr=G+Gs$$

The resultant gain Gr is equal to the sum of the gain of the antenna G and the gain of the sections (secondary antennas) Gs.

The total gain $G_{tot}$ of the portable device D' is therefore equal to:

$$G_{tot}=Gx+G+Gs=Gx+Gr$$

where:
Gx: gain of the gain amplifier,
G: gain of the antenna A alone,
Gs: gain of the sections (secondary antennas).

The resultant gain Gr depends, among other things, on the effective area of the antenna A. During the coupling between the antenna A and the sections P1, P2, P3, P4, the effective area of the antenna A is modified and is equivalent to the area of the antenna A to which is added the areas of the sections P1, P2, P3, P4. Moreover, the resultant gain Gr depends not only on the length of the antenna A, but also on the length of the secondary antennas, that is to say on the length of the sections P1, P2, P3, P4 which are connected to each other.

FIG. 4 shows all of the switching means S1, S2, S3, S4 open. The resultant gain Gr of the antenna A corresponds to the gain G of the antenna alone.

In FIG. 3, the resultant gain Gr is maximum $Gr_{max}$, the first, second and third switching means S1, S2, S3 are closed and the fourth switching means S4 is open. The secondary antenna coupled with the antenna A is constituted by the sections which are cross-hatched: that is to say the first section P1, connected to the second section P2, connected to the third section P3, connected to the fourth section P4. The length of the secondary antenna is maximal in this case and, consequently, the resultant gain Gr is also maximal $Gr_{max}$. It will be noted that the maximum resultant gain $Gr_{max}$ is obtained by opening the switching means that are at the greatest distance from the antenna A, which, in the example shown in FIG. 3, is the fourth switching means S4.

The longer the secondary antenna is, the more the resultant gain Gr increases. In other words, the more there are of sections P1, P2, P3, P4 connected together, the more the resultant gain Gr increases.

However, the minimum resultant gain $Gr_{min}$ is obtained when the four switching means, the first, the second, the third and the fourth switching means S1, S2, S3, S4 are all closed. In this case, the frame C is constituted by a single continuous conductive metal section, that is to say a closed loop surrounding the antenna A. The current then flows in the frame C then acting as a screen limiting the transmission and reception of radio-frequency waves by the antenna A.

In FIG. 5, the resultant gain Gr is an intermediate gain $Gr_{int}$, greater than the gain G of the antenna A, obtained with the configuration of the switching means S1, S2, S3, S4 shown in FIG. 4, but less than the maximum resultant gain $Gr_{max}$ obtained with the configuration of the switching means S1, S2, S3, S4 shown in FIG. 3.

Thus, by opening/closing the switching means S1, S2, S3, S4, the resultant gain Gr is varied and a table (see FIG. 7) of gain values $Gr_{min}$, G, Gr1, Gr2 . . . $Gr_{int}$, $Gr_{max}$ is obtained as a function of the open position ("0" character in the columns of the table) or of the closed position ("1" character in the columns of the table) of each switching means S1, S2, S3, S4.

The method for adjusting the total gain of a portable communication device D' according to the invention comprises a first calibration step (step 1) wherein for each open/closed state of each switching means S1, S2, S3, S4, the value of the resultant gain $G_{tot}$ of the portable device D' is measured. The measurement of this total gain $G_{tot}$ is carried out by measuring the transmission and reception power of the portable device D', by producing a radiation pattern. This measuring method is known to those skilled in the art and will not be described in detail here.

Then, the values of the total gain $G_{tot}$ as a function of the open/closed state of each switching means S1, S2, S3, S4 are stored (for example in the form of a table, see FIG. 7) in the control means 40 (step 2).

During the transmission/reception of radio-frequency waves by the portable device D', the control means 40 open/close each switching means S1, S2, S3, S4 according to the values stored in the preceding step in order to adjust the total gain $G_{tot}$ to a desired value (step 3).

The adjustment method of the invention therefore comprises the following steps:
In a prior step:
said insulating casing B' is equipped with a frame C which surrounds the insulating casing B' at least partially and which comprises a plurality of sections P1, P2, P3, P4 made of conductive metal, said sections P1, P2, P3, P4 not being connected and separated from each other by openings F1, F2, F3, F4,
the device D' is equipped with a plurality of switching means S1, S2, S3, S4, each switching means having a closed state in which two consecutive sections are electrically connected together, and an open state in which two consecutive sections are not connected to each other, and means of control 40 of the plurality of switching means S1, S2, S3, S4,
then the adjustment method comprises the following steps:
Step 1: the value of the total gain $G_{tot}$ is measured for each open/closed state of each switching means S1, S2, S3, S4,
Step 2: the value of the total gain $G_{tot}$ as a function of the open/closed state of each switching means S1, S2, S3, S4 is stored in the control means 40,
Step 3: during the transmission/reception by the portable device D', opening or closing of each switching means S1, S2, S3, S4 by the control means 40, according to the values stored in step 2 in order to adjust the total gain $G_{tot}$ to a desired value.

Thus, the invention makes it possible, by the addition of a metal frame C comprising several sections and of switching means electrically connecting the sections one by one, to adjust the total gain $G_{tot}$ of the portable device D' by adjusting the resultant gain Gr, which arises from the sum of the gain G of the antenna A and of the gain of the sections Gs thus connected with each other. The invention effectively makes it possible not to have to modify the antenna A, but to be able to keep a standard antenna A of standard size for all types of applications and to easily adjust the total gain $G_{tot}$ of the portable device D' according to the applications by selecting the metal sections of the frame C to be coupled with the antenna A.

The invention claimed is:
1. A portable radio communication device with adjustable total gain ($G_{tot}$), the device comprising:
an insulating casing comprising at a periphery thereof at least partially a frame comprising at least two sections made of conductive metal, unconnected and separated by an opening;
a printed circuit;
a radio-frequency antenna;
an electronic transmitter/receiver circuit electrically connected to said antenna, said antenna and the electronic transmitter/receiver circuit being mounted on the printed circuit, contained in the insulating casing;

a switching system having a closed state in which the two sections are electrically connected to each other, and an open state in which the two sections are disconnected from each other;

a controller configured to control the switching system, wherein a coupling between the antenna and the at least two sections modifies the total gain ($G_{tot}$) of the portable device, resulting in a new total gain Gr that is a resultant gain, wherein Gr=G+Gs, Gr being equal to a sum of a gain of the antenna (G) and a gain of the at least two sections (Gs), the total gain being equal to:

$$G_{tot}=Gx+G+Gs=Gx+Gr,$$

where

Gx=a gain of a gain amplifier,

G=the gain of the antenna alone, and

Gs=the gain of the at least two sections, the resultant new total gain Gr being varied by the opening or closing of the switching system.

2. The portable radio communication device with adjustable total gain ($G_{tot}$) as claimed in claim 1, wherein the at least two sections of the frame comprise a plurality of sections made of conductive metal, said sections being unconnected and separated from each other by openings, and the device further comprises:

a plurality of switching devices, each switching device having a closed state in which two consecutive sections are electrically connected to each other, and an open state in which two consecutive sections are disconnected from each other, wherein the controller controls the plurality of switching devices.

3. The portable radio communication device with adjustable total gain as claimed in claim 2, wherein the sections all have different dimensions.

4. The portable radio communication device with adjustable total gain as claimed in claim 3, wherein the openings all have widths different from each other.

5. The portable radio communication device with adjustable total gain as claimed in claim 3, wherein the openings all have widths identical to each other.

6. The portable radio communication device with adjustable total gain as claimed in claim 2, wherein the openings all have widths different from each other.

7. The portable radio communication device with adjustable total gain as claimed in claim 6, wherein the openings all have widths identical to each other.

8. The portable radio communication device with adjustable total gain as claimed in claim 2, wherein the openings all have widths identical to each other.

9. The portable radio communication device with adjustable total gain as claimed in claim 2, wherein said device is included in a hands-free badge for access to a motor vehicle.

10. The portable radio communication device with adjustable total gain as claimed in claim 2, wherein said device is included in a mobile telephone.

11. The portable radio communication device with adjustable total gain ($G_{tot}$) as claimed in claim 1, wherein said device is included in a hands-free badge for access to a motor vehicle.

12. The portable radio communication device with adjustable total gain as claimed in claim 1, wherein said device is included in a mobile telephone.

13. A motor vehicle comprising:

the portable radio communication device as claimed in claim 1.

14. A method of adjusting a total gain of a portable radio communication device, said device including an insulating casing comprising at a periphery thereof at least partially a frame comprising at least two sections made of conductive metal, unconnected and separated by an opening, a printed circuit, a radio-frequency antenna, an electronic transmitter/receiver circuit electrically connected to said antenna, said antenna and the electronic transmitter/receiver circuit being mounted on the printed circuit, contained in the insulating casing, said adjustment method comprising:

equipping said insulating casing with the frame which surrounds the insulating casing at least partially and which comprises a plurality of sections made of conductive metal, said sections being unconnected and separated from each other by openings;

equipping the device with:

a plurality of switching devices, each switching device having a closed state in which two consecutive sections are electrically connected to each other, and an open state in which two consecutive sections are disconnected from each other, and a controller configured to control the plurality of switching devices;

measuring a value of the total gain ($G_{tot}$) for each open/closed state of each switching device;

storing the value of the total gain ($G_{tot}$) in the controller as a function of the open/closed state of each switching device;

during transmission/reception by the antenna, opening or closing each switching device by the controller, according to the stored value in order to adjust the total gain ($G_{tot}$) to a desired value; and modifying the total gain ($G_{tot}$) of the portable device, by a coupling between the antenna and the plurality of sections, resulting in a new total gain Gr that is a resultant gain, where Gr=G+Gs, Gr being equal to a sum of a gain of the antenna (G) and a gain of the plurality of sections (Gs), the total gain being equal to:

$$G_{tot}=Gx+G+Gs=Gx+Gr,$$

where

Gx=a gain of a gain amplifier,

G=the gain of the antenna alone, and

Gs=the gain of the plurality of sections, the resultant new total gain Gr being varied by the opening or closing of the plurality of switching devices.

\* \* \* \* \*